(12) United States Patent
Benavides

(10) Patent No.: US 9,302,144 B1
(45) Date of Patent: Apr. 5, 2016

(54) VEHICLE MOUNTED EXERCISE STATION

(71) Applicant: Gianfranco Benavides, Lima (PE)

(72) Inventor: Gianfranco Benavides, Lima (PE)

( * ) Notice: Subject to any disclaimer, the term of this patent is extended or adjusted under 35 U.S.C. 154(b) by 0 days.

(21) Appl. No.: 14/606,722

(22) Filed: Jan. 27, 2015

(51) Int. Cl.
| | |
|---|---|
| *A63B 21/16* | (2006.01) |
| *A63B 21/00* | (2006.01) |
| *A63B 23/12* | (2006.01) |
| *A63B 1/00* | (2006.01) |
| *A63B 17/04* | (2006.01) |

(52) U.S. Cl.
CPC . *A63B 21/16* (2013.01); *A63B 1/00* (2013.01); *A63B 17/04* (2013.01); *A63B 21/1469* (2013.01); *A63B 23/1218* (2013.01)

(58) Field of Classification Search
CPC .. A63B 21/00047; A63B 21/068; A63B 1/00; A63B 17/00; A63B 17/04; B60R 9/045
USPC ............................ 224/484, 309, 321, 325, 922
See application file for complete search history.

(56) References Cited

U.S. PATENT DOCUMENTS

| | | | |
|---|---|---|---|
| 7,565,990 B2 | 7/2009 | Bryan, IV | |
| 2006/0237501 A1* | 10/2006 | Gonzalez | B60R 9/08 224/325 |
| 2013/0053220 A1* | 2/2013 | Monaco | A63B 1/00 482/39 |
| 2015/0246643 A1* | 9/2015 | Levi | B60R 3/005 182/113 |

* cited by examiner

*Primary Examiner* — Oren Ginsberg
*Assistant Examiner* — Jennifer M Deichl
(74) *Attorney, Agent, or Firm* — Mark Terry

(57) ABSTRACT

A mobile exercise system includes a rectangular shaped frame designed for attachment to a roof of an automobile, at least one pole, at least one riser comprising a bar and a horizontal bore, at least one bore in the frame, the bore designed for holding the pole when in stowed mode, a in the frame for holding the riser when in stowed mode, at least one vertical bore in the frame, into which said the riser can be inserted and secured when in deployed mode, such that said riser extends vertically from the frame, and wherein the pole may be inserted into the horizontal bore of the riser and extends horizontally from the riser when in deployed mode; and a horizontal bore in the frame, into which said pole can be inserted and secured when in deployed mode, such that the pole extends horizontally from the frame.

19 Claims, 4 Drawing Sheets

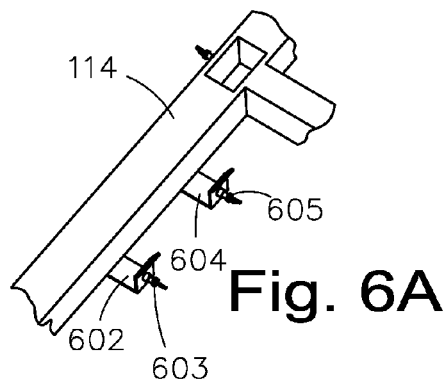
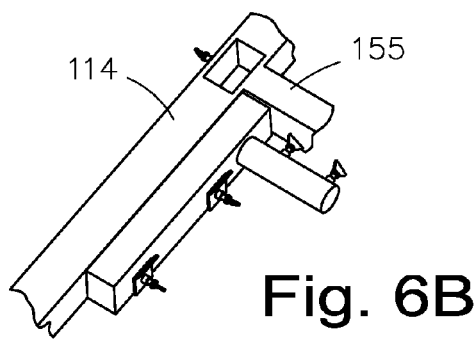
Fig. 6A    Fig. 6B
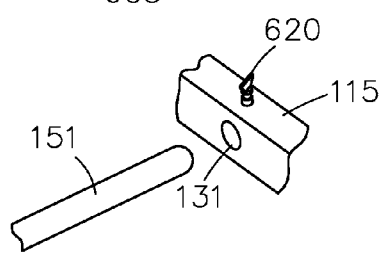
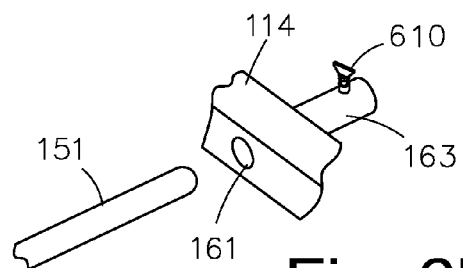
Fig. 6C    Fig. 6D
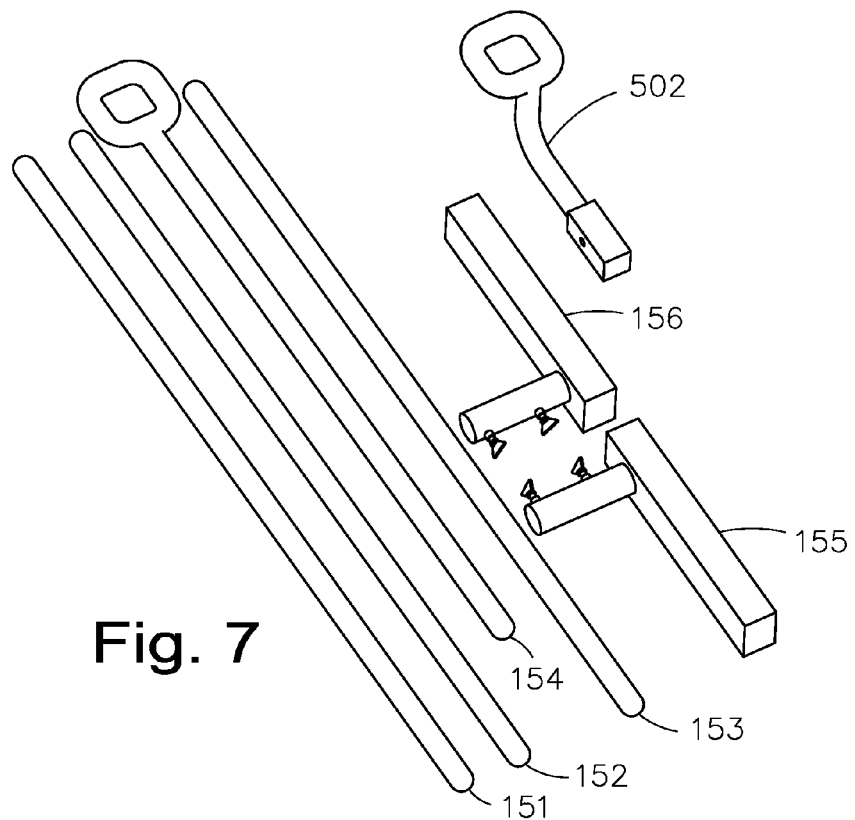
Fig. 7

VEHICLE MOUNTED EXERCISE STATION

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The disclosed embodiments to exercise machines and stations, and more particularly, to portable exercise machines and stations.

BACKGROUND OF THE INVENTION

A wide variety of exercise machines and stations are available on the commercial market. Whether an individual desires to work out his or her upper body or lower body, there is an exercise machine or station that satisfies almost any need. One area where exercise machines have had increasing popularity is in the mobile exercise machine space. Typically, a mobile exercise machine will be a small machine or device that can be easily packed away in a person's luggage or bag so that the individual can easily transport it with him or her when travelling. Due to the nature in which said mobile exercise devices are used, these devices are usually small in size, light in weight and address only a single type of exercise.

One of the problems with currently available mobile exercise devices in the limited range of exercises that can be done with the devices. Small devices that weight very little can only offer one or a handful of exercises for the individual, such as biceps or triceps workouts. This leaves much to be desired for individuals that want a full body workout or simply a well-rounded workout. Another problem with some of the available mobile exercise devices is that they must be attached to a static base or secured to the floor in order to provide resistance for the user. Some rubber band mobile exercise devices, for example, require that the band is attached to a wall or door, or simply secured to the floor by the user's feet. In situations where an individual does not have an easy way to secure the band to an object or to the floor, this can be an inconvenience. Further, available mobile exercise devices that come with a sturdy base require both tools and time to assemble before they can be used by an individual. This can be time consuming and tedious for the individual.

Consequently, a need exists to overcome the problems with the prior art, and particularly for a more efficient way of providing a mobile exercise device that provides a well-rounded workout.

SUMMARY OF THE INVENTION

Briefly, according to an embodiment of the present invention, a mobile exercise system is disclosed. A mobile exercise system includes a rectangular shaped frame designed for attachment to a roof of an automobile, at least one pole, at least one riser comprising a bar and a horizontal bore, at least one bore in the frame, the bore designed for holding the pole when in stowed mode, at least one flange in the frame, the flange designed for holding the riser when in stowed mode, at least one vertical bore in the frame, into which said at least one riser can be inserted and secured when in deployed mode, such that said at least one riser extends vertically from the frame, and wherein said at least one pole may be inserted into the horizontal bore of the at least one riser and extends horizontally from the at least one riser when in deployed mode; and at least one horizontal bore in the frame, into which said at least one pole can be inserted and secured when in deployed mode, such that said at least one pole extends horizontally from the frame.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIGS. 6A, 6B, 6C, and 6D are illustration of various fasteners used in the mobile exercise system, according to one embodiment.

FIG. 7 is an illustration of various components of the mobile exercise system, according to one embodiment.

DETAILED DESCRIPTION

Figure 1:
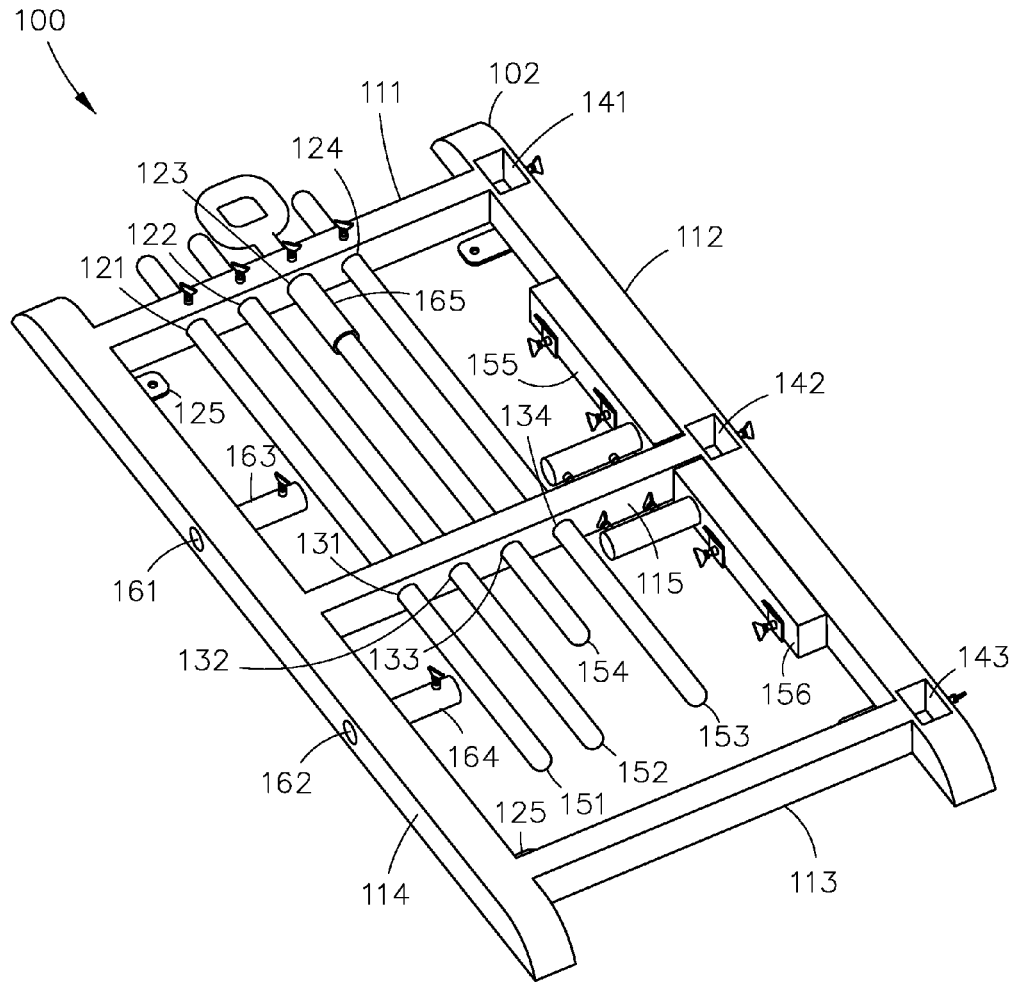
FIG. 1 is an illustration of a top view of a mobile exercise system in a stowed mode, according to one embodiment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

The disclosed embodiments provide a mobile and manual-deployable exercise system that is easily transportable on a car's roof rack. The mobile exercise system takes advantage of the fact that the roof of most cars are built to carry a load and provide height to any object placed on the roof. The height offered by a car's roof, allows for certain exercises that require height to be executed, such as dips, pull-ups, swings and scissors. Although the disclosed embodiments disclose a mobile exercise system for transport on an automobile, the disclosed embodiments support the integration of the mobile exercise system on other types of vehicles, such as trucks, boats and hovercraft.

The disclosed embodiments allow users to engage in exercises (such as dips and pull ups) that cannot be done with other mobile exercise devices that do not provide the height and stability necessary to do so. Additionally, the mobile exercise system can be easily transportable on an automobile. The mobile exercise system does not interfere with the operation of the automobile and does not negatively affect the automobile. The disclosed embodiments further improve over the prior art by providing an exercise device that is easily stowed on a roof rack, thereby providing an easily accessible exercise device on one's automobile. The disclosed embodiment further improve over the prior art by providing an exercise station with a minimum number of parts. Lastly, the disclosed embodiments provide a mobile exercise device that also doubles as an automobile roof rack that can be used to transport materials or luggage on the roof rack via the automobile. This increases the usability of the device and decreases the number of items that a user must bring with him when travelling to a different location.

Figure 2:
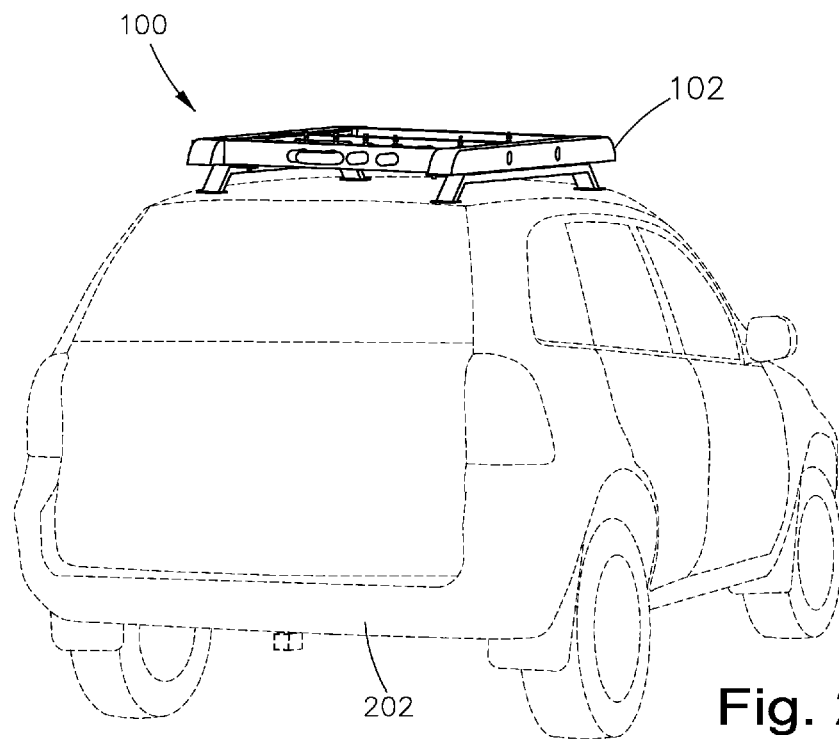
FIG. 2 is an illustration of a perspective view of a mobile exercise system in a stowed mode, according to one embodiment.
Figure 3:
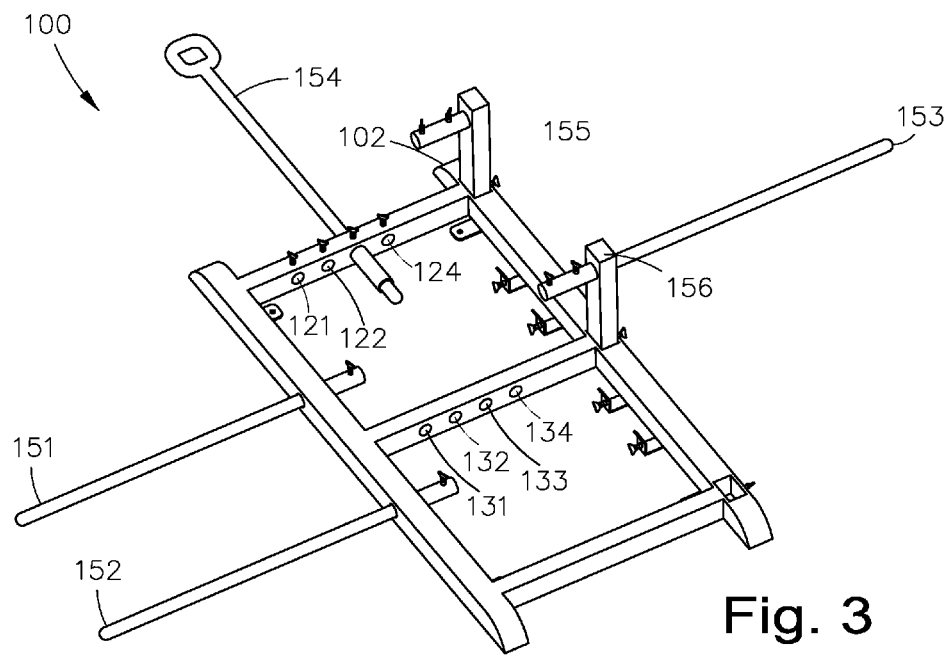
FIG. 3 is an illustration of a top view of a mobile exercise system in an exercise mode, according to one embodiment.
Figure 4:
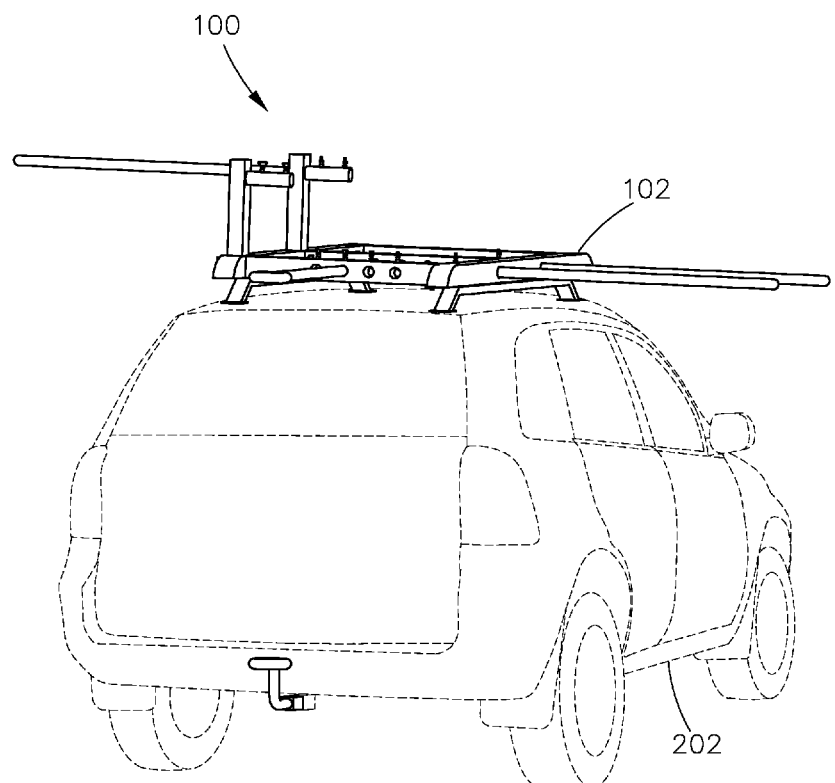
FIG. 4 is an illustration of a perspective view of a mobile exercise system in an exercise mode, according to one embodiment.
Figure 5:
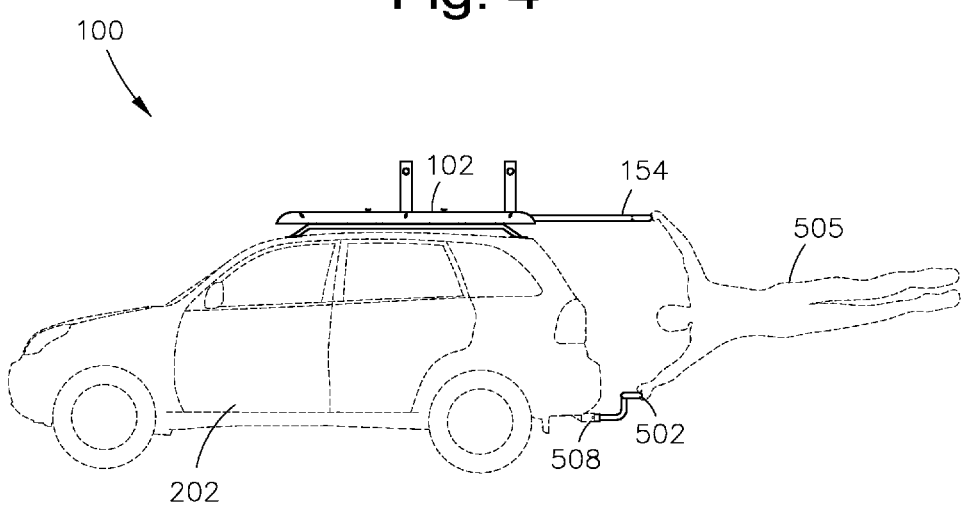
FIG. 5 is an illustration of a side view of a mobile exercise system in an exercise mode, according to one embodiment.

The mobile exercise system 100 will now be described with reference to FIGS. 1 through 7 below, according to one embodiment. FIGS. 3-5 are illustrations of the mobile exercise system 100 in a deployed mode, while FIGS. 1-2 are illustrations of the mobile exercise system 100 in a storage or stowed mode. Deployed mode refers to the state in which all of the relevant components of the system 100 necessary for exercise (such as poles) have been extended or deployed for the use of a person to exercise. Storage mode refers to the state in which the relevant components of the system 100 are stowed during transport of the system. In this way, the system 100 has two modes—deployed mode and stowed mode.

FIG. 1 is an illustration of a top view of the mobile exercise system 100 in a stowed mode, according to one embodiment. FIG. 1 shows that the system 100 includes a roof rack element 102 comprising at least four bars 111, 112, 113 and 114 that together comprise a rectangular or quadrilateral shape. Bar 111 is parallel to bar 113, bar 112 is parallel to bar 114, and the bars 111, 113 may be perpendicular to bars 112, 114. A middle bar 115 may be parallel to bars 111, 113. Bars 111 through 115 may have rectangular or square cross sections and said bars may be coupled to one another via welding (such as stick welding, arc welding, electroslag welding, gas welding, spot welding, seam welding, butt welding, flash welding, projection welding, laser beam welding and ultrasonic welding) or another form of joining two elements.

The roof rack 102 may include one or more flanges 125 that extend into the interior circumference of the roof rack, wherein said flanges include at least one orifice for accepting a fastener to fasten the roof rack to the automobile. The fasteners may include screws, bolts, nuts, etc. The flanges 125 may be coupled to the bars 114, 112 at or near the corners of the square or quadrilateral created by the bars 111 through 114.

Bar 111 may include four horizontal bores 121, 122, 123 and 124 that are arranged perpendicular to the bar 111. The bores are referred to as horizontal because when the roof rack 102 is placed on the roof of an automobile, the bores 121, 122, 123 and 124 are horizontal to the ground. Bar 115 may also include four horizontal bores 131, 132, 133 and 134 that are arranged perpendicular to the bar 115. The four horizontal bores 131, 132, 133 and 134 align with the four horizontal bores 121, 122, 123 and 124 such as that a pole inserted into a bore in bar 111 may also be inserted into a corresponding bore in bar 115. Thus, bore 121 is aligned along the same central axis as bore 131, bore 122 is aligned along the same central axis as bore 132, bore 123 is aligned along the same central axis as bore 133, and bore 124 is aligned along the same central axis as bore 134. The horizontal bores may have a circular cross section, a square cross section or a rectangular cross section. The horizontal bores are designed to accept insertion of a pole 151 through 154 such that said pole fits securely within said bores in either stowed mode or deployed mode.

Bar 112 may include three vertical bores 141, 142 and 143 that are arranged perpendicular to the bar 112. The bores are referred to as vertical because when the roof rack 102 is placed on the roof of an automobile, the bores 141, 142 and 143 are vertical to the ground. The bores 141, 142 and 143 may have a circular cross section, a square cross section or a rectangular cross section. The vertical bores are designed to accept insertion of the shaft of an L-shaped element 155, 156 such that said element fits securely within said bores in deployed mode.

The system 100 includes three poles 151, 152 and 153 that may comprise elongated shafts. The poles 151 through 153 are shaped such that they fit securely within the four horizontal bores 131, 132, 133 and 134 that align with the four horizontal bores 121, 122, 123 and 124 such as that a pole inserted into a bore in bar 111 may also be inserted into a corresponding bore in bar 115, when in stowed mode. The poles 151, 152 and 153 may be designed for comfortable gripping by a person's hand when doing an exercise, such as a pull-up. The system 100 also includes pole 154 that may comprise an elongated shaft with a hand loop on a distal end. The hand loop may be designed for comfortable gripping by a person's hand. The shaft of the pole 154 is shaped such that it fits securely within any of the four horizontal bores 131, 132, 133 and 134 that align with the four horizontal bores 121, 122, 123 and 124, when in stowed mode.

The system 100 may also include two L-shaped elements 155, 156 that each comprise a shaft with a square or rectangular cross section on one end and a tubular element on the other end. The lumens of the tubular elements are designed to accept insertion of a pole 151 through 154 such that said pole fits securely within said lumens in deployed mode. The shafts of the L-shaped elements 155, 156 are designed to be inserted into the vertical bores such that said shafts fits securely within said bores in deployed mode.

Alternative to the L-shaped elements, risers may be used, wherein each riser comprises a shaft with a square or rectangular cross section and a bore near one end of the shaft. The lumen of the bore is designed to accept horizontal insertion of a pole 151 through 154 such that said pole fits securely within said lumen in deployed mode (such as is shown in FIG. 6C). The shaft of the riser is designed to be vertically inserted into the vertical bores such that said shaft fits securely within said bore in deployed mode.

The bar 114 may also include two horizontal bores 161, 162 arranged perpendicular to the bar 114. On one side of each of the two horizontal bores 161, 162 is a tubular structure 163, 164, wherein horizontal bore 161 is located along the same linear axis of the tubular structure 163 and the horizontal bore 162 is located along the same linear axis of the tubular structure 164. This allows a pole 151 through 154 to be inserted into bore 161 and structure 163 or bore 162 and structure 164 such that said pole is held in place securely by said bore and structure when in deployed mode. The tubular structures 163, 164 may be located within a circumference of the roof rack 102. Also, on one side of horizontal bore 123 is a tubular structure 165, wherein horizontal bore 123 is located along the same linear axis of the tubular structure 165. This allows pole 154 to be inserted into bore 123 and structure 165 such that said pole is held in place securely by said bore and structure (and solely by said bore and structure) when in deployed mode. The tubular structure 165 may be located within a circumference of the roof rack 102. In this document, any reference to the circumference of the roof rack refers to an imaginary area created by drawing a line around the footprint of the roof rack.

It should be noted that FIG. 1 shows that poles 151 through 154 (as well as L-shaped elements 155, 156) are substantially located within a circumference of the roof rack 102 when in stowed mode, so as to allow for easy and less cumbersome driving of the automobile while transporting the system 100. It should also be noted that FIG. 1 shows that poles 151 through 154 (as well as L-shaped elements 155, 156, or, alternatively, the risers) are oriented in the horizontal orientation on the roof rack 102 when in stowed mode. It should also be noted that although FIG. 1 shows only four horizontal bores in bar 111, three vertical bores in bar 112, no bores in bar 113, four horizontal bores in bar 115 and two horizontal bores in bar 114, the disclosed embodiments support any number of horizontal and vertical bores in any bar or riser. It should further be noted that although FIG. 1 shows only one tubular element in bar 111, two tubular elements in bar 114, and one tubular element in each riser, the disclosed embodiments support any number of tubular elements in any bar or riser. Lastly, although FIG. 1 shows only four poles and two risers, the disclosed embodiments support any number of bars or risers.

The components of the system 100 can be formed from plastic, a plastic derivative, wood, metal, alloys, composites, polymers, ceramics, carbon fiber, as well as any combination thereof or any other suitable material. Also, the components of the system 100 can be can be manufactured from injection molding, extrusion, by using a lathe or any other suitable manufacturing process. The components of the system 100 can be stamp manufactured from a planar metallic sheet, molded from plastic using conventional plastic molding processes, milled from a single piece of metal or molded from a moldable material using conventional molding processes. The low number of parts, especially moving parts, and the simplicity of the design, results in a system 100 that is straightforward and easy to fabricate.

In one alternative, the bars 111 through 115, may include pole holder elements, wherein each pole holder element comprises a circular ring that is attached to the bar via a flange. Each ring is sized such that is allows a pole 151 through 154 to be inserted into said ring such that said pole is held in place securely by said ring when in stowed mode. In one embodiment, there may be two pole holder elements located along the same axis along bar 114, such that a pole may be inserted into both pole holder elements for safe stowing. Also, there may be two pole holder elements located along the same axis along bar 112. Further, there may be one pole holder element located on bar 111, and another pole holder element located on bar 115 along the same axis as the first pole holder element, such that a pole may be inserted into both pole holder elements for safe stowing. Fasteners, such as those shown below, with reference to FIGS. 6A through 6D, may be used to fasten a pole to said pole holder elements. This allows for securing the pole to the roof rack 102 when in stowed mode and during travel or transportation.

FIG. 2 is an illustration of a perspective view of the mobile exercise system 100 in a stowed mode, according to one embodiment. FIG. 2 provides a better view of the mobile exercise system 100 as it rests securely on top of an automobile 202. FIG. 2 also shows that the mobile exercise system 100 also doubles as an automobile roof rack 102 that can be used to transport materials or luggage on the roof rack via the automobile 202. Materials and luggage may easily be attached or secured to the roof rack when in stowed mode. This increases the usability of the system 100 and decreases the number of items that a user must bring with him when travelling to a different location, i.e., the user need not purchase and bring an exercise device and separate roof rack. Note that the system 100 may be used as a conventional roof rack to transport materials or luggage when in stowed mode.

FIG. 3 is an illustration of a top view of the mobile exercise system 100 in an exercise mode, according to one embodiment. FIG. 3 shows that the mobile exercise system 100 has been prepared for use in exercise. The L-shaped element 155 has been inserted into the bore 141 such that the L-shaped element 155 is supported securely and solely by said bore. The L-shaped element 156 has been inserted into the bore 142 such that the L-shaped element 156 is supported securely and solely by said bore. Note that the nature of said coupling of said L-shaped elements with said vertical bores is such that the coupling is secure enough for the L-shaped element to support the weight of a person doing exercise on said L-shaped element. That is, said coupling does not move or shift substantially when the weight of a person doing exercise has been placed on said L-shaped element.

Further, FIG. 3 shows that the pole 151 has been inserted into bore 161 and structure 163 such that pole 151 is supported securely and solely by said bore and structure. The pole 152 has been inserted into bore 162 and structure 164 such that pole 152 is supported securely and solely by said bore and structure. The pole 154 has been inserted into bore 123 and structure 165 such that pole 154 is supported securely and solely by said bore and structure. The pole 153 has been inserted into the tubular element of the L-shaped element 156 such that pole 153 is supported securely and solely by said tubular element. Note that the nature of said coupling of poles with said horizontal bores and tubular structures is such that the coupling is secure enough for the poles to support the weight of a person doing exercise on said poles. That is, said coupling does not move or shift substantially when the weight of a person doing exercise has been placed on said poles.

FIG. 3 shows that the poles 151, 152 may be used to perform exercises usually done on two parallel bars such as dips, leg raises and circular swings. Likewise, poles may be inserted into the L-shaped elements 155, 156 to produced two parallel bars, on which one may perform exercises usually done on two parallel bars. Further, any of said poles may be used to perform exercises wherein a pole at a certain height is necessary, such as pull ups, chest high pull ups, chin-ups, leg raises, etc.

It should be noted that FIG. 3 shows that poles 151 through 154 are substantially located outside a circumference of the roof rack 102 when in deployed mode. That is, in the deployed mode, poles 151 through 154 extend outwards from the roof rack 102 so as to allow the user to perform exercises on said poles. It should also be noted that FIG. 3 shows that the shaft of the L-shaped elements 155, 156, or, alternatively, the risers, are oriented in the vertical orientation on the roof rack 102 when in deployed mode.

FIG. 4 is an illustration of a perspective view of a mobile exercise system in an exercise mode, according to one embodiment. FIG. 4 provides a better view of the mobile exercise system 100 as it rests securely on top of an automobile 202, when in deployed mode.

FIG. 5 is an illustration of a side view of the mobile exercise system 100 in an exercise or deployed mode, according to one embodiment. FIG. 5 provides a better view of the mobile exercise system 100 as it rests securely on top of an automobile 202, when in deployed mode. Also shown in FIG. 5 is a hand element 502 that comprises an L-shaped element with a hand loop attached to one end. The hand loop may be designed for comfortable gripping by a person's hand. The L-shaped element of the hand element 502 may comprise shafts with square cross sections. FIG. 5 shows that one end of the hand element 502 may be inserted into the receiver tube of the hitch 508 of the automobile 202. The hand loop end of the hand element 502 therefore juts outwards and upwards from the automobile 202. This arrangement allows the user 505 to grip both the hand loop of pole 154 and the hand loop of the hand element 502 to perform the human flag exercise, wherein the user grips vertically arranged grips and then moves his body parallel to the ground, thereby resembling a human flag.

FIGS. 6A, 6B, 6C, and 6D are illustration of various fasteners used in the mobile exercise system 100, according to one embodiment. FIG. 6A shows the bar 114 may be coupled with two L-brackets 602, 604, wherein each L-bracket includes a corresponding screw (or other fastener) 603, 605, respectively, that extends through a (possibly threaded) hole or orifice in the corresponding L-bracket. This allows an L-shaped element to be inserted into the L-brackets when in stowed mode (as shown in FIG. 6B). Once in the L-brackets, the screws 603, 605 are extended through the L-brackets to provide pressure against the L-shaped element or to further travel into a corresponding aligned (possibly threaded) holes or orifices in the L-shaped element (see FIG. 6B). This allows for securing the L-shaped element to the roof rack 102 when in stowed mode and during travel or transportation.

FIG. 6C also shows the end of pole 151 being inserted into the horizontal bore 131 in bar 115 when in stowed mode. The bar 115 includes a corresponding screw (or other fastener) 620 that extends through a (possibly threaded) hole or orifice in the bar. Once the pole is in the bore 131, the screw 620 is extended through the bar 115 to provide pressure against the pole or to further travel into a corresponding aligned (possibly threaded) hole or orifice in the pole. This allows for securing the pole to the roof rack 102 when in stowed mode and during travel or transportation.

FIG. 6D also shows the end of pole 151 being inserted into the horizontal bore 161 in bar 114 when in deployed mode. The pole 151 further travels into the tubular element 163 aligned with the bore 161. The tubular element 163 includes a corresponding screw (or other fastener) 610 that extends through a (possibly threaded) hole or orifice in the tubular element. Once the pole is in the bore 161 and element 163, the screw 610 is extended through the tube 163 to provide pressure against the pole or to further travel into a corresponding aligned (possibly threaded) hole or orifice in the pole. This allows for securing the pole to the roof rack 102 when in deployed mode.

FIG. 7 is an illustration of various components of the mobile exercise system 100, according to one embodiment. FIG. 7 shows three poles 151, 152 and 153 that may comprise elongated shafts. The poles 151 through 153 are shaped such that they fit securely within the four horizontal bores 131, 132, 133 and 134 that align with the four horizontal bores 121, 122, 123 and 124 such as that a pole inserted into a bore in bar 111 may also be inserted into a corresponding bore in bar 115, when in stowed mode. The poles 151, 152 and 153 may be designed for comfortable gripping by a person's hand when doing an exercise, such as a pull-up. The system 100 also includes pole 154 that may comprise an elongated shaft with a hand loop on a distal end. The hand loop may be designed for comfortable gripping by a person's hand. The shaft of the pole 154 is shaped such that it fits securely within any of the four horizontal bores 131, 132, 133 and 134 that align with the four horizontal bores 121, 122, 123 and 124, when in stowed mode.

FIG. 7 also shows two L-shaped elements 155, 156 that each comprise a shaft with a square or rectangular cross section on one end and a tubular element on the other end. The lumens of the tubular elements are designed to accept insertion of a pole 151 through 154 such that said pole fits securely within said lumens in deployed mode. The shafts of the L-shaped elements 155, 156 are designed to be inserted into the vertical bores such that said shafts fits securely within said bores in deployed mode.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

I claim:

1. A mobile exercise system, comprising:
    a rectangular shaped frame designed for attachment to a roof of an automobile;
    at least one pole;
    at least one riser comprising a bar and a horizontal bore;
    at least one bore in the frame, the bore designed for holding the at least one pole when in a stowed mode;
    at least one flange in the frame, the at least one flange designed for holding the at least one riser when in the stowed mode;
    at least one vertical bore in the frame, into which said at least one riser can be inserted and secured when in a deployed mode, such that said at least one riser extends vertically from the frame, and wherein said at least one pole may be inserted into the horizontal bore of the at least one riser and extends horizontally from the at least one riser when in the deployed mode; and
    at least one horizontal bore in the frame, into which said at least one pole can be inserted and secured when in the deployed mode, such that said at least one pole extends horizontally from the frame.

2. The mobile exercise system of claim 1, further comprising:
    a fastener for coupling any of said at least one pole to the frame when in the stowed mode and when in the deployed mode.

3. The mobile exercise system of claim 2, further comprising:
    a fastener for coupling the at least one riser to the frame when in the stowed mode.

4. The mobile exercise system of claim 3, further comprising:
    a fastener for coupling the at least one riser to the at least one vertical bore when in the deployed mode.

5. The mobile exercise system of claim 4, further comprising:
    a fastener for coupling any of said at least one pole to the horizontal bore in the at least one riser when in the deployed mode.

6. A mobile exercise system, comprising:
- a rectangular frame designed for attachment to a roof of an automobile, the frame comprising first, second, third, fourth and fifth bars arranged in a rectangular shape, wherein the first bar includes at least two horizontal bores, the second bar is perpendicular to the first bar and includes at least one vertical bore, the third bar is parallel to the first bar and includes at least two horizontal bores that align with an equal number of horizontal bores in the first bar, and the fourth bar is parallel to the second bar and includes at least two horizontal bores perpendicular to the fourth bar;
- at least one riser comprising a bar on a first end and a horizontal bore on a second end, the at least one riser being coupled to the second bar when in a stowed mode, and wherein the first end of the at least one riser is inserted into the at least one vertical bore of the second bar when in a deployed mode;
- at least one first pole that fits securely within one of the horizontal bores in the first bar and one of the horizontal bores in the third bar when in a stowed mode, and that fits securely within one of the horizontal bores in the fourth bar when in deployed mode;
- at least one second pole that fits securely within one of the horizontal bores in the first bar and one of the horizontal bores in the third bar when in the stowed mode, and that fits securely within a bore of the least one riser when in deployed mode.

7. The mobile exercise system of claim 6, further comprising:
- at least one fastener coupled with each of the horizontal bores in the first bar, so as to fasten any of said at least one first pole and at least one second pole inserted into a corresponding bore.

8. The mobile exercise system of claim 7, further comprising:
- at least one fastener coupled with the at least one vertical bore in the second bar, so as to fasten the at least one riser inserted into the at least one vertical bore, when in the deployed mode.

9. The mobile exercise system of claim 8, further comprising:
- at least one fastener coupled with each of the horizontal bores in the fourth bar, so as to fasten any of said at least one first pole and at least one second pole inserted into a corresponding bore, when in the deployed mode.

10. The mobile exercise system of claim 9, further comprising:
- at least one fastener coupled with the horizontal bore in the at least one riser, so as to fasten any of said at least one first pole and at least one second pole inserted into the bore, when in the deployed mode.

11. The mobile exercise system of claim 10, further comprising:
- at least one fastener coupled with the bar of the at least one riser, so as to fasten the at least one riser to the second bar, when in the stowed mode.

12. The mobile exercise system of claim 11, further comprising:
- at least two flanges extending from the frame, wherein each flange includes an orifice for accommodating a fastener for fastening the frame to the automobile.

13. A mobile exercise system, comprising:
- a roof rack designed for attachment to a roof of an automobile, the roof rack comprising first, second, third and fourth bars arranged in a rectangular shape, wherein the first bar includes four horizontal bores, the second bar is perpendicular to the first bar and includes two vertical bores, the third bar is parallel to the first bar and includes four horizontal bores that align with the four horizontal bores in the first bar, and the fourth bar is parallel to the second bar and includes two horizontal bores perpendicular to the fourth bar;
- a first L-shaped element comprising a bar on a first end and a tube on a second end, the first L-shaped element being coupled to the second bar when in a stowed mode, and wherein the first end of the first L-shaped element is inserted into one of the vertical bores when in a deployed mode;
- a second L-shaped element comprising a bar on a first end and a tube on a second end, the second L-shaped element being coupled to the second bar when in the stowed mode, and wherein the first end of the second L-shaped element is inserted into one of the vertical bores when in the deployed mode;
- a first pole that fits securely within one of the horizontal bores in the first bar and one of the horizontal bores in the third bar when in the stowed mode, and that fits securely within one of the horizontal bores in the fourth bar when in the deployed mode;
- a second pole that fits securely within one of the horizontal bores in the first bar and one of the horizontal bores in the third bar when in the stowed mode, and that fits securely within one of the horizontal bores in the fourth bar when in the deployed mode;
- a third pole that fits securely within one of the horizontal bores in the first bar and one of the horizontal bores in the third bar when in the stowed mode, and that fits securely within the tube of one of the L-shaped elements when in the deployed mode; and
- a fourth pole that fits securely within one of the horizontal bores in the first bar and one of the horizontal bores in the third bar when in the stowed mode, and that fits securely and solely within one of the horizontal bores in the fourth bar when in the deployed mode, and wherein the fourth pole includes a hand loop on a distal end.

14. The mobile exercise system of claim 13, further comprising:
- at least one fastener coupled with each of the four horizontal bores in the first bar, so as to fasten any of said first pole, second pole, third pole, and fourth pole inserted into a corresponding bore.

15. The mobile exercise system of claim 14, further comprising:
- at least one fastener coupled with each of the vertical bores in the second bar, so as to fasten any of said first and second L-shaped elements inserted into a corresponding vertical bore, when in the deployed mode.

16. The mobile exercise system of claim 15, further comprising:
- at least one fastener coupled with each of the two horizontal bores in the fourth bar, so as to fasten any of said first pole, second pole, third pole, and fourth pole inserted into a corresponding bore, when in the deployed mode.

17. The mobile exercise system of claim 16, further comprising:
- at least one fastener coupled with the tube of each of the L-shaped elements, so as to fasten any of said first pole, second pole, third pole, and fourth pole inserted into any said tube, when in deployed mode.

18. The mobile exercise system of claim 17, further comprising:
- at least one fastener coupled with the bar of each of the L-shaped elements, so as to fasten the L-shaped elements to the second bar, when in stowed mode.

19. The mobile exercise system of claim 18, further comprising:
    at least two flanges extending from the roof rack, wherein each flange includes an orifice for accommodating a fastener for fastening the roof rack to the automobile.

\* \* \* \* \*